United States Patent [19]
White

[11] 3,874,050
[45] Apr. 1, 1975

[54] METHOD OF MAKING A BEARING

[76] Inventor: Charles S. White, 35815-42nd St., East, Palmdale, Calif. 93550

[22] Filed: Apr. 4, 1974

[21] Appl. No.: 457,860

Related U.S. Application Data

[63] Continuation of Ser. No. 334,192, Feb. 20, 1973, abandoned, which is a continuation-in-part of Ser. No. 316,844, Dec. 20, 1972, , which is a continuation-in-part of Ser. No. 76,110, Sept. 28, 1970, abandoned.

[52] U.S. Cl. .................... 29/149.5 B, 29/149.5 NM
[51] Int. Cl. ........................................... B23p 11/00
[58] Field of Search ............. 29/149.5 B, 149.5 R, 29/149.5 NM, 149.5 PM

[56] References Cited
UNITED STATES PATENTS 3,047,934 8/1962 Magner, Jr. ................ 29/149.5 NM
3,626,566 12/1971 Kilgour .......................... 29/149.5 B
3,654,683 4/1972 White ............................ 29/149.5 B Primary Examiner—Thomas H. Eager
Attorney, Agent, or Firm—Burton & Parker

[57] ABSTRACT

A bearing assembly is constructed by winding a resin impregnated low friction thread on an inner bearing member. The thread turns are then compacted together and the resin caused to fuse bonding the turns in a continuous matrix. Around the outside of the thread layer an outer member is then constructed in locked engagement therewith and the thread layer and outer member together form a relatively movable bearing member around the inner bearing member.

15 Claims, 7 Drawing Figures

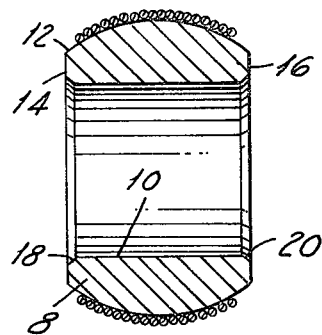
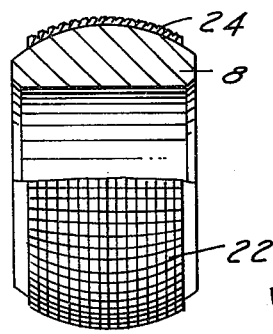
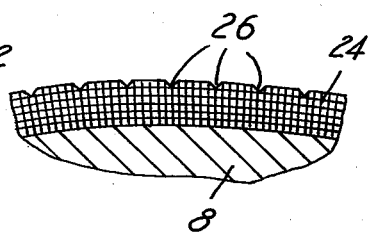
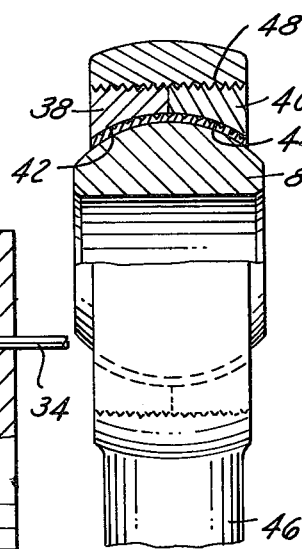
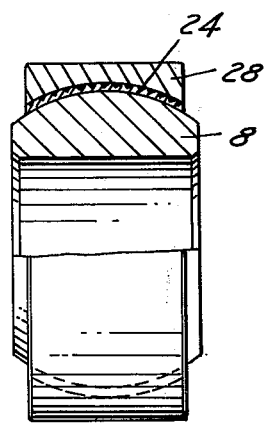
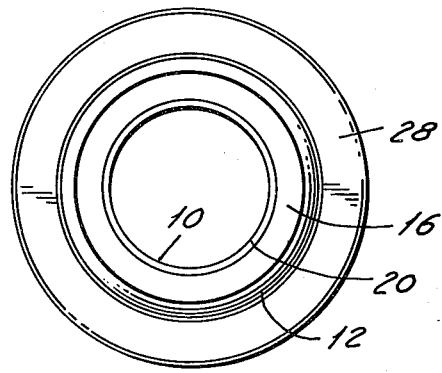

METHOD OF MAKING A BEARING

This is a continuation, of application Ser. No. 334,192 filed Feb. 20, 1973, abandoned and which is a continuation-in-part of U.S. Pat. Application, Ser. No. 316,844, filed Dec. 20, 1972, which is a continuation-in-part of U.S. Pat. Application Ser. No. 76,110, filed Sept. 28, 1970, and now abandoned.

FIELD OF INVENTION

This invention relates to a method of constructing bearings and has particular, though not exclusive utility in the construction of rod end joints.

BACKGROUND OF INVENTION

In the prior art, rod end bearings have been constructed utilizing a low friction cloth, which is adhered inside a preformed outer housing or outer bearing member. The inner ball member is then disposed within the outer housing and the latter is upset around the ball to retain the ball therewithin. While the approach to the manufacture of such bearings has enjoyed substantial success, there have been drawbacks that have for some years prompted efforts to improve on the process but with no essential breakthrough.

SUMMARY OF THE INVENTION

According to my new approach for the manufacture of such bearings, and other bearings which may be manufactured in accordance with the same, the inner ball member is wound with a continuous, resin-impregnated, bondable, low friction thread, to provide a layer of the thread thereon, and this layer is then compacted and shaped with heat and pressure to closely conform to the ball and fuse the resin whereby the thread turns are locked together in a continuous resin matrix.

Around the outside of the low friction is constructed the outer housing which is locked to the low friction. Such layer and the outer housing thus become the outer bearing surrounding the inner ball member. The housing may be constructed in various ways as by metal plating or spraying, or it may be constructed of preformed parts which are secured to the low friction layer.

BRIEF DESCRIPTION OF THE DRAWINGS

FIG. 1 is a cross-sectional view through a ball member showing the low friction bondable thread wrapped thereon;

FIG. 2 shows the ball of FIG. 1 after the low friction layer has been shaped and fused with heat and pressure;

FIG. 3 is an enlarged fragmentary cross-section through a portion of the low friction layer and ball of FIG. 2;

FIG. 4 illustrates one of the steps of one method of forming the housing about the low friction layer;

FIG. 5 is a cross-sectional view through a finished bearing assembly made according to this disclosure;

FIG. 6 is an elevation of the bearing of FIG. 5; and

FIG. 7 is a cross-sectional view through a modified form of the bearing.

BRIEF DESCRIPTION OF PREFERRED EMBODIMENTS

In FIG. 1 a steel ball member 8 having the usual bore 10 and a highly polished bearing surface 12, opposite end faces 14 and 16 provided with chamfers 18 and 20, is shown following the winding thereon of a layer of bondable low friction thread. This thread is more fully described in my co-pending U.S. Pat. Application Ser. No. 76,110 filed Sept. 28, 1970, and in my co-pending U.S. Pat. Application Ser. No. 316,844 filed Dec. 20, 1972. Briefly, the preferred form of such thread comprises strands or filament bundles of bondable fibers such as Nylon, Dacron or cotton or other bondable fibers intertwined, mingled or twisted with strands or filament bundles of low friction fibers such as, and preferably, Teflon, i.e., tetrofluroethylene. In addition, the thread has been thoroughly impregnated with a bonding resin, such as a phenol formaldehyde resin, or some other suitable resin. The resin is preferably a thermosetting resin though suitable thermoplastics may in some instances be utilized. At the time the thread is wound onto the ball the resin should be essentially solidified, though it may be slightly tacky to facilitate temporary sticking to the ball in the position it is wrapped on. In the case of thermosetting resins, the resin should preferably be in the B-stage condition, viz., essentially free of volatile solvents or other gas producing substances.

The winding may be carried out using thread or coil winding type machinery. The surface of the ball may be covered from a point just spaced from face 14 to just short of face 16, or in other words, substantially as shown in FIG. 1. The resin-impregnated thread, which at the time of impregnation is sized and shaped to a specified degree and configuration (generally round) will appear as shown in FIG. 1 following the winding operation.

The next step is to mold the low friction layer. This is accomplished between a pair of heated dies, not shown, which clamp the exposed surface of the low friction and squeeze the low friction layer against the spherically curved surface of the ball. The heat transmitted by the dies to the resin in the thread will cause the resin to soften and coalesce, and the pressure imposed by the dies will tightly press the windings into intimate conformity to the spherical surface of the ball. The dies should remain closed about the ball until the resin has set sufficiently into the C-stage so that it forms a matrix locking the thread turns together in an essentially homogenous mass so that upon removal of the dies the low friction layer thus formed will retain the configuration and size thus imparted to it. In the case of thermosetting resin the C-staging of the resin should be well underway though not yet complete for reasons hereinafter explained. In the case of thermoplastic resin the dies should be cooled sufficiently before opening so that the low friction layer will be stable.

The surfaces of the dies engaging the low friction layer may exhibit a raised grid or network to impress a corresponding grid or network 22 in the outer surface of the low friction layer 24. Such grid in the outer surface of the low friction layer is defined by intersecting grooves 26 shown in FIG. 3. This grid arrangement will help to securely lock the outer housing to the low friction layer. While the grid is shown in FIG. 2 as comprising grooves which intersect at 90 degrees, any other grid arrangement desired may be utilized.

The outer housing 28 shown in FIG. 5 may be applied to the low friction layer in a number of different ways, but one preferable method is partially shown in FIG. 4, wherein the housing is constructed by electrodeposition. First the layer 24 must be rendered electrically conductive. Such is accomplished by coating it with a conductive material such as metallic paint, silver mirroring, or the like well understood in the art. Next the assembly is placed between a pair of non-conductive shields or masks 30 and 32 which closely overlie the exposed faces of the ball and terminate at the edges of the low friction layer, one of which carries an electrode 34 that contacts the ball. The assembly is then immersed in a plating tank and the outer housing is plated up as at 36 between the masks. When the plating has progressed to the desired extent the assembly is removed from the tank and placed in an oven to cure the resin fully to the C-stage. Such curing will also help to further lock the outer housing to the low friction layer. Following curing of the resin the outer housing portion 36 is machined to its final desired configuration, as for example as shown in FIGS. 5 and 6.

The grid network 22 will cause the electrodeposited outer housing to enter into the grooves 26 and thereby serves to tightly lock the outer housing and low friction layer together. Because the surface 12 of the ball is polished, the resin does not adhere to it and the ball may be broken free of the low friction layer by a slight turning or twisting relative to the housing.

The foregoing method of making a bearing assembly having an entrapped ball will provide a bearing with essentially zero play because the low friction layer was originally conformed closely to the ball surface and remains in the same condition throughout the remaining steps of the method and is finally surrounded in intimate engagement by the outer housing. Also, the outer housing will be free of internal stresses which is obviously advantageous. It will be apparent to those skilled in the art that the masks 30 and 32 may be shaped to provide an outer housing of special configuration, such as a rod end which, with a minimum of machining, may be shaped to the final desired configuration. Techniques of high speed electroplating may be utilized to speed production of parts formed by this method. If the housing 28 is shaped as shown in FIGS. 5 and 6 it may be secured in a rod end in any suitable fashion as by the so-called "Grumman Grooves" or the like.

In addition to electroplating, metallic spraying may also be employed, or the housing may be preformed and then fitted or shaped to the low friction layer and adhesively bonded thereto. For example, the outer housing may be preformed as an annulus which is then placed over the low friction layer and swaged inwardly thereagainst, a layer of adhesive being first interposed between the annulus and low friction layer. In FIG. 7 I show another method. Here a pair of identical annuli 38 and 40, each having a spherically curved inner surface 42 and 44, are adhesively secured to the low friction layer, and the assembly is then surrounded by an outer housing 46. The annuli and housing may be screwed together as by the cooperating threads 48 or held together in any other suitable fashion.

What is claimed is:

1. The method of making a bearing comprising:
   winding on the exterior bearing surface of an inner bearing member through a plurality of juxtaposed helical turns a continuous strand of bondable low friction thread impregnated with a bonding resin,
   treating said windings to form a low friction bearing layer including compacting the thread turns together and into close conformity with the bearing surface of the inner bearing member and fusing together the resin of adjacent turns to bond the thread turns together in a continuous matrix,
   and constructing an outer member about the bearing layer in locked engagement therewith to form an outer relatively movable bearing member around the inner bearing member.

2. The invention as defined by claim 1 characterized in that said exterior bearing surface of the inner bearing member is a spherically curved convex surface.

3. The invention defined in claim 1 characterized in that the resin is a thermosetting resin and at the time of treating said windings the resin is in the B-stage and the treating comprises softening of the resin and compacting together of the thread turns to effect a coalescence of the resin and at least partially curing the resin into the C-stage.

4. The invention defined by claim 3 characterized in that following construction of the outer member about the bearing layer the resin is treated to fully cure it into the C-stage.

5. The invention defined by claim 1 characterized in that said construction of the outer member comprises electrodepositing metal onto the bearing layer to build up the outer member thereon.

6. The invention defined by claim 5 characterized in that prior to said electrodeposition the bearing layer is rendered electrically conductive by applying thereto an electrically conductive coating.

7. The invention defined by claim 6 characterized in that said treating of the winding comprises impressing on the exposed surface a multiplicity of indentations, and said electrically conductive coating and electrodeposition is applied to said indented surface to effect a mechanical interlock therebetween.

8. The invention defined by claim 4 characterized in that the construction of the outer member comprises an electrodeposition of metal on the bearing layer.

9. The invention defined by claim 2 characterized in that during treating of the windings prior to constructing the outer member thereabout the exposed surface is indented to provide a series of recesses, and the outer member is constructed by electrodepositing metal on such indented surface, and following the electrodeposition of the outer member the resin is further treated to fully cure it to the C-stage.

10. The invention defined by claim 1 characterized in that said outer member and bearing layer are adhesively secured together to effect the interlocked engagement therebetween.

11. The invention defined by claim 10 characterized in that said outer member is swaged in situ about the bearing layer and adhesively secured thereto.

12. The method of making a bearing having an inner ball member entrapped within an outer housing comprising:
   winding on the exterior of the inner ball member through a plurality of juxtaposed helical turns a continuous strand of bondable low friction thread impregnated with a bonding resin,
   treating said turns with heat and pressure to compact the thread turns together and into close conformity with the surface of the inner ball member and to cause coalescing of the resin of adjacent turns and bonding of the thread turns together in a continuous solidified structure, and electrodepositing a metal housing around the low friction layer.

13. The invention defined by claim 11 characterized by machining the metal housing to a desired configuration.

14. The invention defined by claim 11 characterized by coating the low friction layer with a conductive coating prior to the electrodeposition of the metal housing.

15. The method of making a bearing having an inner ball member entrapped within an outer housing comprising:

winding on the exterior of the inner ball member through a plurality of juxtaposed helical turns a continuous strand of bondable low friction thread impregnated with a bonding resin, treating said turns with heat and pressure to compact the thread turns together and into close conformity with the surface of the inner ball member and to cause coalescing of the resin of adjacent turns and bonding of the thread turns together in a continuous solidified structure, adhering to the exterior of the low friction layer a pair of identical annuli arranged in confronting relation and having concave internal surfaces mating with the spherical shape of the low friction layer, and locking said annuli within an outer housing member.

* * * * *